United States Patent [19]

Häring

[11] 4,003,401
[45] Jan. 18, 1977

[54] LIQUID OUTLET VALVE

[76] Inventor: Rolf A. Häring, 86a Hauptstrasse, 4148 Pfeffingen, Switzerland

[22] Filed: Mar. 17, 1975

[21] Appl. No.: 559,260

[30] Foreign Application Priority Data

Mar. 28, 1974 Switzerland .................. 4345/74

[52] U.S. Cl. .......................... 137/599.2; 251/147; 251/346; 251/351

[51] Int. Cl.² ........................................ F16K 31/58

[58] Field of Search ............... 251/147, 346, 351; 417/181, 185; 403/355, 357; 137/599.2; 85/32 CS

[56] References Cited

UNITED STATES PATENTS

| 1,950,172 | 3/1934 | Gavaza | 417/185 X |
| 2,361,244 | 10/1944 | Smith | 403/355 |
| 2,381,589 | 8/1945 | Hayes | 417/181 |
| 2,665,931 | 1/1954 | Vegren | 403/355 |
| 2,690,717 | 10/1954 | Goodrie | 417/181 |

FOREIGN PATENTS OR APPLICATIONS

| 1,170,550 | 9/1958 | France | 417/185 |
| 1,042,992 | 11/1958 | Germany | 251/351 |

*Primary Examiner*—William R. Cline
*Attorney, Agent, or Firm*—Heinrich W. Herzfeld; Gilbert L. Wells

[57] ABSTRACT

A liquid outlet valve is adapted for connecting to a pipe. The valve has a throughhole member with an entry, an outlet and a passageway therethrough. A closure member is associated with the throughhole member to close off the outlet and an elastic flexible seal is provided in the closing member. A connecting means movably connects the closure member with the throughhole member to control the flow of liquid.

7 Claims, 4 Drawing Figures

LIQUID OUTLET VALVE

This invention relates to a liquid outlet valve.

A liquid outlet valve of the present type has been described in U.S. Pat. No. 2,112,290 and is preferably used (as described in this patent) as a water outlet valve having a main outlet and at least one lateral outlet and comprising further entry means adapted for being connected to the tap of a water pipe in a kitchen or bathroom as well as a passageway from the entry means to the main outlet. This valve serves for the passage of water in the form of a jet, as well as liquid flow control means at the main outlet for controlling the amounts of water which pass through the main outlet, on the one hand, and through the lateral outlet or outlets, on the other hand. The initially described outlet valve serves as the water flow control means in the aforesaid U.S. patent. However, this outlet valve suffers from various drawbacks. Its manufacture is relatively complicated and the sealing gasket, washer or the like member therein is subject to rather strong wear and must be replaced quite often. The life of the outlet valve is relatively short and in order to be cleaned, the entire valve must be removed.

SUMMARY OF THE INVENTION

It is therefore an object of this invention to provide a liquid outlet valve wherein the sealing member has a long life and which is simple to manufacture and easy to clean.

This object is attained in accordance whith the invention, by providing a liquid outlet valve of the initially described type wherein the throughhole member and the closure member have cylindrical surfaces opposite one another, and helical grooves of equal pitch but different depth are provided in said cylindrical surfaces; and the valve further comprises a coil spring having the same pitch as the said grooves, the thickness of the wire of which coil spring is equal to approximately twice the depth of the flatter one of the two grooves, and further having a bias in radial direction relative to the helix described by the said grooves which bias is directed into the flatter one of the grooves.

Preferably, the closing member has the shape of a cap having an internal lateral wall constituting one of the two cylindrical surfaces, and the external surface of the throughhole member is cylindrical and is disposed opposite to the said internal cylindrical surface of the closing member.

The cap preferably surrounds the throughhole member at the outlet opening of the latter and has in its frontal wall a discharge orifice and comprises holding means about the said orifice for holding the sealing member. The sealing member can be a washer or gasket of flexible, preferably elastic material such as rubber, but preferably it has the shape of an O-ring.

In preferred embodiments of the liquid outlet valve according to the invention, such sealing member is disposed below the lowermost turn of the helical grooves, and the throughhole member has an annular groove near the lowermost end thereof in which groove the O-ring is inserted, and the cap has, inwardly of its discharge orifice about the latter, a bevelled valve seat on which the said O-ring is sealingly seated when the cap is in closing position.

As it is easier to manufacture a coil spring having an outwardly directed radial bias than such spring with a radial bias which is directed inwardly, the flatter helical groove is preferably provided in the internal cylindrical surface of the cap.

BRIEF DESCRIPTION OF THE DRAWINGS

Further details and advantages of the liquid outlet valve according to the invention will be described in the following description thereof in connection with the accompanying drawings in which.

DESCRIPTION OF THE PREFERRED EMBODIMENTS

Figure 1:
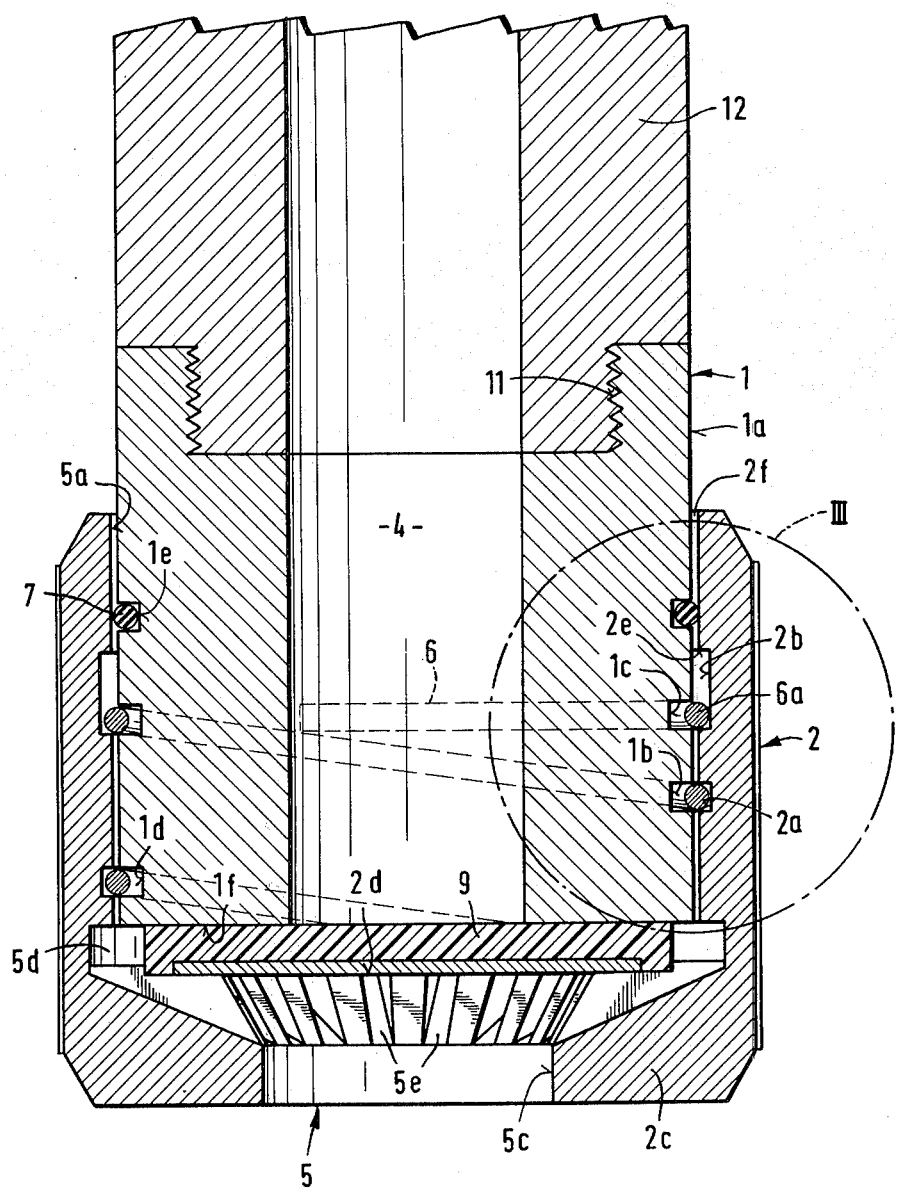
FIG. 1 is an axial sectional view of a first embodiment of the outlet valve according to the invention.

In the embodiment shown in FIG. 1, the liquid outlet valve according to the invention comprises a throughhole member 1 provided with a passageway 4 along the central axis thereof, and is attached by means of an internal threading 11 to the open end of a pipe 12 for conveying a liquid, and preferably water. A cap-shaped closure member 2 is placed with its cylindrical inner wall over the cylindrical external surface 1a of throughhole member 1. It serves as obturating means and is provided at its lower end with a radially inwardly projecting annular flange 2c which surrounds a central discharge orifice 5 and bears on its inner face 2d, which is facing toward the frontal face 1f of throughhole member 1, an at least partially flexible sealing element 9. The latter is surrounded at its periphery by an annular space 5d which is in free communication by way of radial grooves 5e provided in the internal face 2d of closure member 2, with the discharge orifice 5 of the latter. In the part thereof opposing the internal wall 5a of closure member 2, the external surface 1a of throughhole member 1 is provided with a groove 1b, 1c, 1d consisting of a helical groove section 1b and two annular groove sections 1c and 1d; the helical groove section 1b opens at its end located toward the discharge orifice 5 into the annular groove section 1d, and with its end turned away from orifice 5 into the annular groove section 1c, so that the helical groove section 1d does not extend to the lowermost end of the throughhole member 1.

The internal cylindrical wall surface 5a of closure member 2 is also provided with a helical groove 2a which has the same pitch as the helical groove section 1b but is less deep than the latter. At its end turned away from the discharge orifice 5, helical groove 2a merges with an annular groove 2b the width of which, in axial direction, is greater than the width, in the same direction, of the opposite annular groove 1c and also greater than the diameter of the wire of a coil spring 6 which is set into the hollow space constituted by the opposing helical groove sections 1b and 2a registering with each other. Coil spring 6 is preferably provided at its end facing away from discharge orifice 5 with an annular spring turn 6a which occupies the free annular space formed by the annular groove sections $1c$ and $2b$ registering with each other.

The depth of groove sections $1b$ and $1c$ is at least equal to the full wire diameter of spring 6, which groove sections $2a$ and $2b$ are flatter, their depth corresponding preferably to one half of the wire diameter of spring 6.

Coil spring 6 and groove sections $1b$, $2a$ and $2b$ cooperate to constitute a kind of thread or screw connection.

When assembling closure member 2 and throughhole member 1, spring 6 is placed into groove sections $1b$ and $1c$ and is compressed to enter these sections fully so that closure member 2 can be pushed past the windings of coil spring 6 without difficulty until helical groove section $2a$ registers with helical groove section $1b$. An outwardly directed radial bias of coil springs 6 then causes the latter to expand and to occupy the position shown in FIG. 2. In this position, a tangential plane TE laid through the center of the wire of the coil spring turns and tangential to the helix of the coil spring is located, under ideal conditions, in the middle of the gap between the inner cylindrical surface $5a$ of closure member 2 and the external cylindrical surface $1a$ of throughhole member 1.

Figure 2:
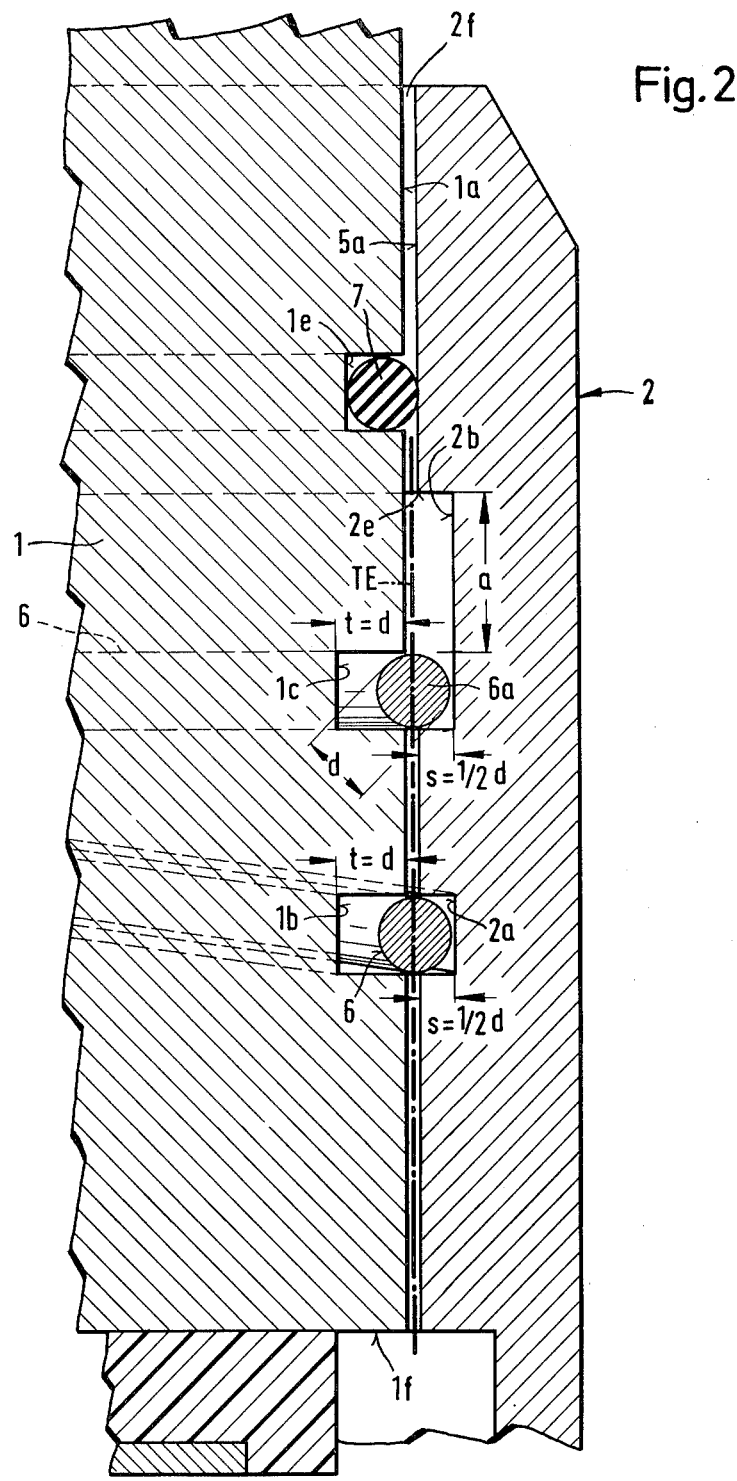
FIG. 2 is a partial view on an enlarged scale, of the cooperating cylindrical surfaces of the embodiment shown in FIG. 1.

Closure member 2 can only be screwed off, i.e. away from frontal face $1f$ of throughhole member 1 until the upper annular edge $2e$ of annular groove $2b$ abuts the annular turn at the upper end of coil spring 6. As shown in FIG. 2 under ideal conditions, the depth $t$ of helical groove section $1b$ is at least equal to twice the diameter $d$ of the wire constituting coil spring 6, while the depth $s$ of annular groove $2a$ is, under ideal conditions, equal to one half of $d$. However, as there is preferably some play between the cylindrical surfaces $1a$ and $5a$, the depth $s$ of groove $2a$ may be somewhat smaller than one half of $d$; this gap permits manufacturing members 1 and 2 from synthetic plastics material by modern injection molding techniques and it is no longer necessary to provide for ground-in metal surfaces as in the case of known cocks. The outwardly directed bias of coil spring 6 must either be dimensioned so exactly that, when the spring 6 is in radially untensioned condition, the tangential plane TE will occupy the middle of the gap between surfaces $1a$ and $5a$ or, if spring 6 is provided with a slightly greater, outwardly directed radial bias, it will come to rest on the bottom of helical groove $2a$ and its tangential plane TE will occupy the above-described ideal position when groove $2a$ has a corresponding depth $s$.

When using a coil spring 6 having an inwardly directed radial bias, it is groove $2a$ which must have the greater depth $s = 2d$, while helical groove section $1b$ must be the flatter groove having a depth $t = \frac{1}{2} \cdot d$.

Furthermore, in the external surface $1a$ of throughhole member 1, an annular groove $1e$ is provided for receiving therein an O-ring 7 which seals the annular space $5d$ against the open end $2f$, away from orifice 5, of closure member 2. In this embodiment, the closure member can be screwed off, and respectively onto, the throughhole member 1 by a distance $a$.

Figure 3:
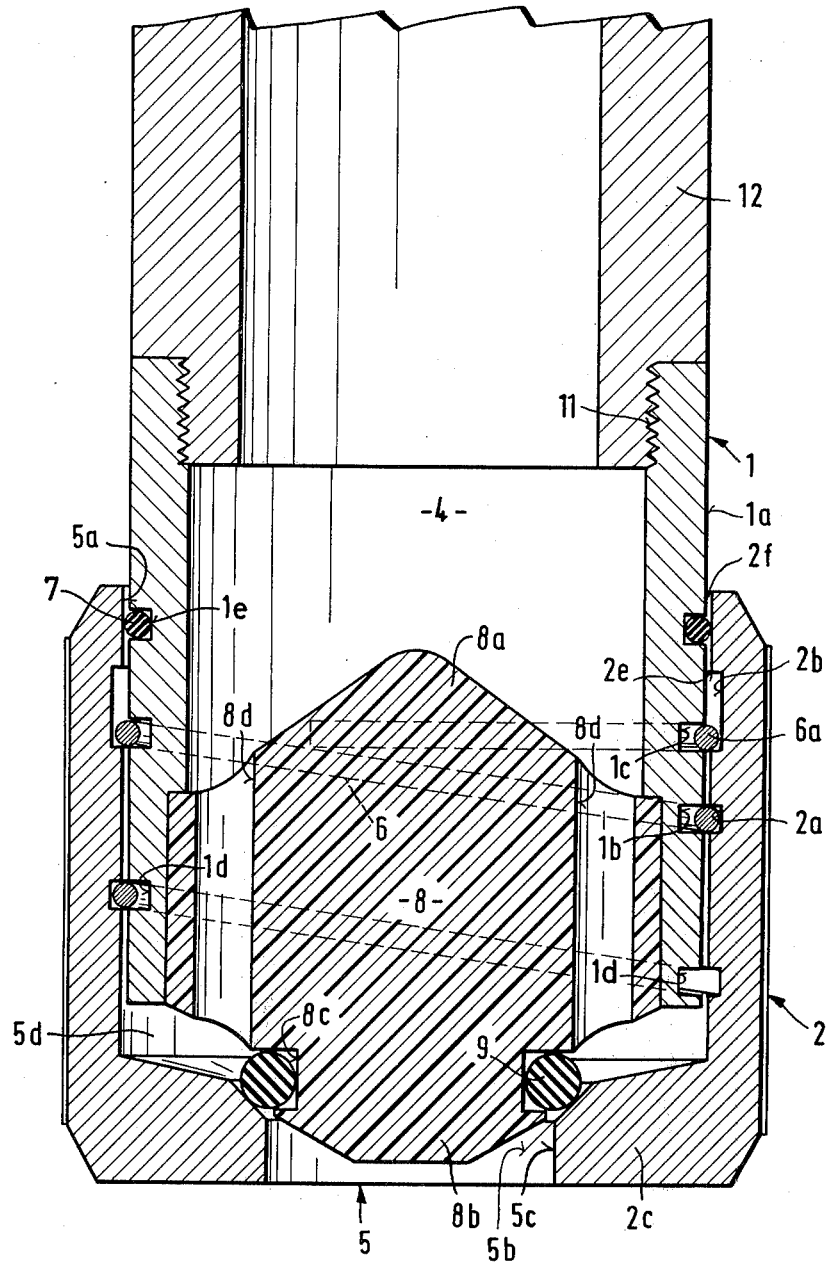
FIG. 3 shows a second embodiment of the invention in longitudinal section.

In the embodiment according to FIG. 3, the closure member 2 has an inwardly projecting annular flange $2c$ at its lower free end, the outer ring wall $5c$ of which encloses the outer zone of orifice 5. The zone within ring wall $5c$ constitutes the main outlet orifice of the valve. On the entry side of this orifice zone, the flange $2c$ is provided with a conical surface $5b$ which delimits the orifice zone toward the hollow interior of closure member 2.

A plastic plug element 8 is firmly set into the outlet end of passageway 4 and has a plug section $8a$ tapered conically toward the interior of passageway 4. At its tapered end past $8b$ facing toward the orifice 5, plug element 8 has an annular groove $8c$ in which is held a sealing ring 9 made from plastics or rubber. Sealing ring 9 closes off the annular space $5d$ against the orifice 5 when sealingly engaging flange $2c$. For, in the closing position of the closure member 2 shown in FIG. 3, the annular flange $2c$ thereof is pressed with its bevelled face $5b$ against sealing ring 9. The plug element 8 is further provided with ducts $8d$ which extend axially relative to passageway 4 and are distributed uniformly in circular arrangement. The ducts $8d$ open out of the end part $8b$ of plug element 8, facing toward the orifice 5 outside of sealing ring 9 and into the annular space $5d$ defined between the peripheral zone of end parts $8b$ and the inner wall of flange $2c$ of closure member 2. On the end surface of plug element 8 turned away from the orifice 5, the ducts $8d$ are in free communication with passageway 4. In order to enable a uniform outflow of the liquid, it is advantageous to provide between the ducts $8d$ a plurality of additional narrow ducts (not shown) which can be displaced inwardly or outwardly relative to ducts $8d$.

Figure 4:
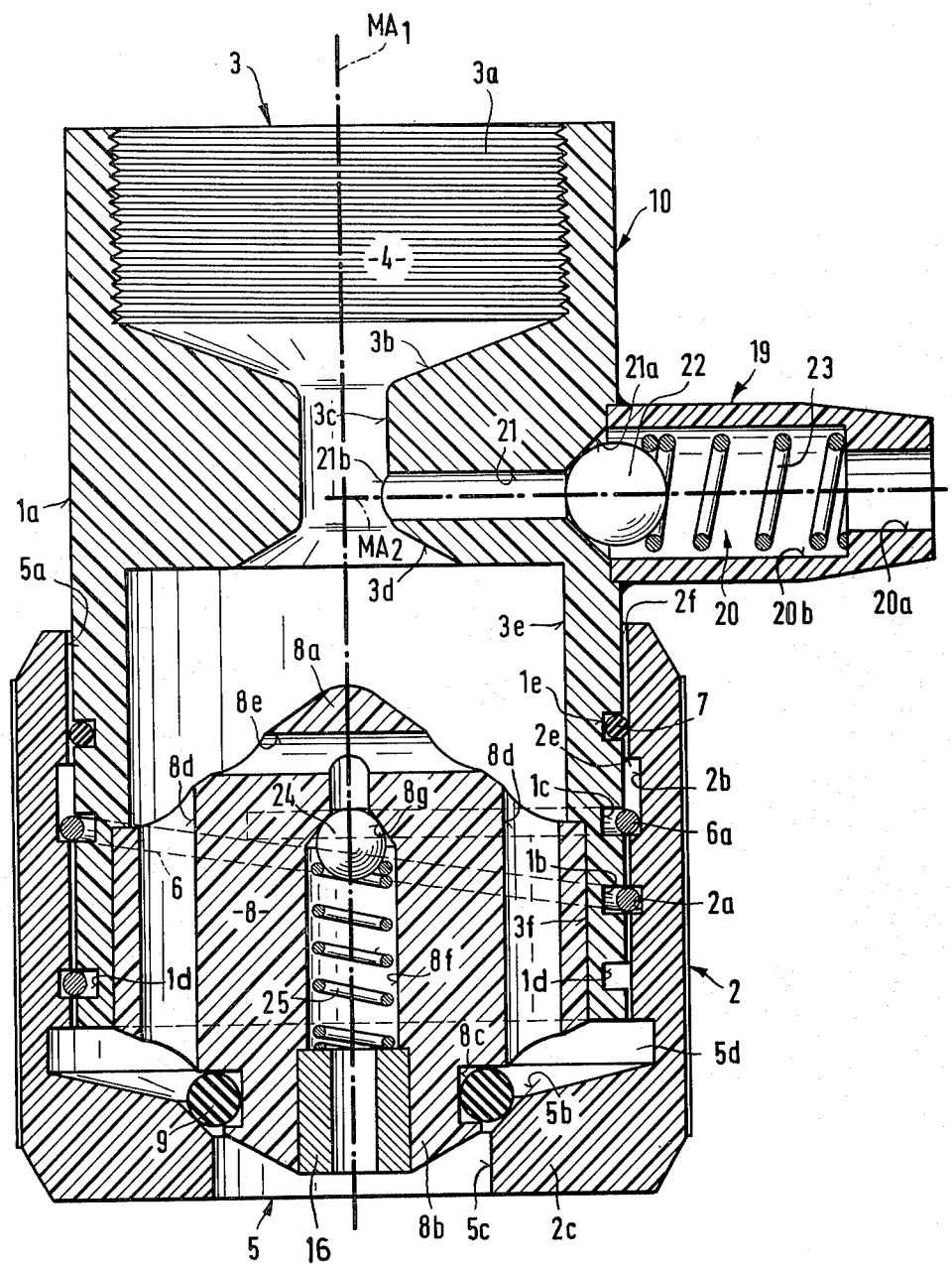
FIG. 4 is a longitudinal sectional view of a two-way water outlet fitting equipped with a preferred embodiment of the outlet valve according to the invention.

Finally, FIG. 4 shows an embodiment of an outlet valve according to the invention similar to that shown in FIG. 3. In this figure, the outlet valve is used in a two-way (water-) outlet fitting having a housing part 10 and, as obturating means, the closure member shown in FIGS. 1 to 3. In the embodiment shown in FIG. 4, these parts are manufactured from synthetic plastics material but they can also be made of metal.

The essentially cylindrical housing 10 has a continuous, stepped passageway 4 which extends along the central valve axis $MA_1$ and is preferably axially symmetrical to the latter. The uppermost entry zone $3a$ of passageway 4 has the entry opening 3 for the liquid to be conveyed and is provided with an inner threading. Entry zone $3a$ is in free communication with a Venturi-shaped duct which comprises a zone $3b$ the wall of which converges in the direction toward orifice 5, and down stream of zone $3b$ a cylindrical zone $3c$. The diameter of the latter zone is smaller than that of entry opening. Duct zone $3c$ merges downstream thereof with duct zone $3d$ of conically divergent wall surface, and the latter communicates in turn with a cylindrical zone $3c$ of passageway 4. At the lower end of passageway 4 there is provided an annular cylindrical recess $3f$ the diameter of which is somewhat larger than that of duct zone $3e$.

The closure member 2 is formed identically with that of the embodiments of FIGS. 2 and 3 and is disposed coaxially with the axis $MA_1$.

The zones $3b$ and $3c$, $3d$ and $3e$ of passageway 4, the ducts $8d$ and the annular space $5d$ form together a main passageway connecting the entry opening 3 with the main discharge orifice 5. The housing 10 is further provided with an outlet socket 19. The latter has a longitudinal passageway 20 having two sections $20a$ and $20b$. Passageway section $20a$ forms the secondary, lateral outlet opening of the two-way valve. The housing 10 further has a radial passage 21 therein which is provided at its outer end with a conical valve seat $21a$ and opens into the passageway section $20b$ of the socket 19.

The internal entry opening 21b of passage 21 opens directly above the divergent duct zone 3d into the end section, on the side of outlet orifice 5, of the cylindrical duct section 3c of main passageway 4. The passageway section 20b of the socket 19 and the passage 21 form together a branch passageway which connects the outlet orifice of the lateral passageway section 20a with the main passageway 4. The cross-sectional area of the entry port 21b of the branch passageway 21 is preferably smaller than that of the cylindrical duct zone 3c which latter forms the narrowest portion of passageway 4. Moreover, it is practical to arrange the passage 21 which forms the entry part of the branch passageway in such a manner that it extends radially outwardly or obliquely outwardly, and ascending toward the side of the entry port 3. The central axis $MA_2$ of passage 21 must therefore intersect the central axis $MA_1$ of the duct zones 3b, 3c in such a manner that the angle between the axis $MA_2$ and the section of the central axis $MA_1$ extending from the intersection of the two axes towards the entry opening 3, is equal to or smaller than 90°.

For certain types of use it can be advantageous to provide the branch passageway 20, 21 with a valve seat which is constituted in the shown embodiment by the bevelled annular surface 21a of passage 21. On the side of the valve seat 21a facing the lateral outlet orifice at the end of passageway section 20a, a ball-shaped valve member 22 is provided in passageway section 20b; a spring 23 is housed in the same passageway section 20b, which spring urges the valve ball 22 against the valve seat 21a.

Furthermore, the plug element 8 can be provided with a valve passageway 8e, 8f which connects the broadened main passageway zone 3e with the main outlet orifice 5. In the embodiment shown in FIG. 4, the valve passageway comprises a transverse bore 8e, open at both ends, and extending through the tapered part 8a of plug element 8 and an axial stepped bore 8f being coaxial with passageway 4 and opening into the transverse bore 8e. Bore 8f has a valve seat 8g tapered conically towards the transverse bore 8e. A ball-shaped valve member 24 is housed in the axial bore 8f on the side of the valve seat 8g facing toward the main outlet orifice at 5c. Ball member 24 is urged against the valve seat 8g by means of a spring 25 which is supported on a retaining sleeve 16.

Recently, there has arisen a need for improving the taste of the drinking water provided through the main pipes of the public water supply system. There have been marketed filters serving for this purpose, especially for use in private households, which filters can be connected to a water tap. As the filters must be replaced after filtering a certain amount of water which depends on the degree of pollution of the water, it is advisable to filter only the water required for drinking purposes and not to pass through the filter any water used for cleaning purposes. This optional diversion of the water flow can be achieved in an especially advantageous manner by means of a fitting equipped with a liquid outlet valve according to the invention. Such a fitting is preferably arranged in such a way that it can be screw-connected directly to the outlet orifice of a water tap.

Hereinafter, there will be described the functioning of such a fitting serving for the optional diversion of a liquid, in particular water, according to FIG. 4. There shall be first explained the functioning of a cock which neither comprises the valve comprising valve seat 21a and ball member 22 nor the valve passageway 8e, 8f and the valve therein having valve seat 8g and ball member 24.

The fitting is preferably adapted for connection to a water tap and the inner threading at the entry opening 3 is suited to be screw-connected to the discharge pipe of a water tap of standard type. The fitting is, in this case, in an approximately vertical position, whereby the main passageway extends approximately vertically and the branch passageway extends approximately horizontally. The main discharge orifice 5 opens into the free surrounding space, while the passageway section 20a which ends in the lateral outlet orifice, can be connected via hose to a filter serving for the purification of the water for drinking purposes. When the water tap, to which the fitting is connected, is opened and water is supplied to the entry opening 3 of the latter, this water is dammed up when the closure member 2 is in the closing position shown in FIG. 4 and can only flow out through the branch passageway 21, 20b. However, when the closure member 2 which obturates the main passageway between the entry port 21b of the branch passageway and the main discharge orifice 5 is displaced towards the front end, i.e. the downward end of the valve, to permit liquid flow through the main passageway, the water can flow from the valve via the main discharge orifice 5. Thereby, a water jet is created in duct zone 3c which flows out into the divergent zone 3d and is diverted outwardly by the conical surface of part 8a of plug element 8 into the ducts 8d. This water jet entrains particles coming into contact with its surface layer and therefore has a suction effect similar to that of the jet of a water jet pump. In consequence hereof, no water will flow into the branch passageway but, on the contrary, water located therein suctioned into the main jet.

When the closure member 2 is screwed off completely from the downward end of throughhole member 1, the cross-sectional area of part of the main passageway between the end of divergent duct section 3d and the outlet orifice 5 is larger throughout than is the narrowest cylindrical duct section 3c. In this case, a divergent duct section 3d and 3e may have a water-free space therein. However, if the closure member 2 is only opened to adopt an intermediate position, the water is dammed up and the divergent sections 3d and 3e are partially or completely flooded and filled with water. Experiments have shown that even in this case in which a so-called flooded water-jet is generated, no water will flow into the branch passageway until the main passageway has been almost totally closed off.

When the water tap connected upstream to the fitting is opened only a little way, air can penetrate into the fitting and no compact jet may be generated. In order to prevent, even in this case, water from flowing into the branch passageway when the closure member is opened, the passage 21 is preferably, as already mentioned above, arranged to extend radially or to ascend obliquely in outward direction.

Furthermore, experiments have shown that the fitting works perfectly, even when the main central axis $MA_1$ extends horizontally. In view hereof, the branch passageway should, however, be arranged in this case in an outwardly ascending position.

When the branch outlet orifice at 20a is connected to a device which disturbs the suction effect produced when closure member 2 is open, a ball-shaped closure member 22 can be provided in the branch passageway. It will form together with valve seat 21a a check valve which closes the branch passageway when a pressure drop occurs therein. Spring 23 is actually not required for this purpose.

However, it is desired that water flows through the branch outlet orifice only when closure member 2 obturates the main passageway completely, the spring 23 can be provided in the branch passageway downstream of valve seat 21a. This spring is then so dimensioned that the valve 21a, 22 will open only when the pressure of the water exceeds a determined limit. Of course, the valve can also be so designed as to permit adjustment of the force of the spring.

The check valve which can be arranged in the valve passage 8e, 8f and which comprises the valve seat 8g and the ball-shaped valve member 24 serves as an excess pressure safety valve. Whenever the device connected to the branch passage orifice or the connection hose are sensitive to pressure, the occurence of unduly high excess pressures can be avoided with the aid of this valve 8g, 24.

Of course, the fitting can be modified in various ways. For example, the branch passageway can also open into the main passageway in the zone of the divergent duct section 3d. Furthermore, it is not absolutely necessary that the entry opening, the narrow duct zone and the divergent duct zone be axially symmetrical and coaxially disposed relative to one another. It is also possible, for example, to have the entry opening extend transverse to the central axis $MA_1$ and to have the water flow through an angle. The part of the main passageway forming the Venturi should however extend in a straight line, so that a well defined water jet can be generated.

The Venturi duct and the divergent zone of the main passageway can also merge with each other gradually. If the Venturi duct converges until directly before its end, the branch passageway must of course open behind the narrowest point of the duct, i.e. in the zone when the duct broadens to merge with the main passageway.

It is also not necessary that the duct converges in the direction of liquid flow therethrough, but it may have a constant cross-sectional area over its entire length. This area need not be smaller than that of the entry opening. For example, the duct can be formed by the entry opening itself or, by the socket protruding into the duct. In any case, the main passageway must be so devised that the liquid flowing therethrough forms a jet, when the closure member is in the open position, and the main passageway is thus open, which jet is directed through the main passageway in such a manner that no water will flow into the branch passageway. A jet is here considered to be a flowing liquid which is confined within a free surface, at least while flowing past the mouth of the branch passageway.

As mentioned herein before, the fitting equipped with the outlet valve according to the invention is destined preferably for applications in which the water reaching the main outlet orifice can flow out of the latter freely in downward direction. It is also possible to provide connecting means also with the main outlet orifice whereby a pipe can be connected thereto. The latter must, however, be so shaped and disposed in such position that its resistance to flow does not impede the generation of a jet in the main passageway. In limit cases, it will be advantageous to provide the branch passageway with the above-mentioned check valve.

What is claimed is:
1. A liquid outlet valve connectable to the outlet of a pipe and comprising:
   a. a throughhole member having an entry opening, a first outlet opening, a straight-through main passage between said entry opening and said first outlet opening, a second outlet opening and a lateral secondary passage branching off from said main passage and leading to said second outlet opening;
   b. a sleeve member surrounding the lower half of said throughhole member, and having annular flange means projecting inwardly outside said first outlet opening of said main passage;
   c. sealing means adapted for closing off said first outlet opening when being urged into sealing engagement with said flange means and with the lower part of said sleeve member outside the latter opening; and
   d. connecting means for movably connecting said sleeve member with said throughhole member, said connecting means serving to adjust the position of said sleeve member and throughhole member relative to one another, thereby controlling the amount of liquid flowing through said main passage;
   e. said throughhole member and said sleeve member having cylindrical surfaces opposite one another and helical grooves of equal pitch but different depth in said cylindrical surfaces to accomodate said connecting means;
   f. and said connecting means being a coil spring having the same pitch as said grooves, the thickness of the wire of which coil spring is equal to approximately twice the depth of the flatter one of said two grooves, and further having a bias in radial direction relative to the helix described by said grooves which bias is directed into the flatter one of said grooves;
   g. the helical groove located in the inner cylindrical surface of said cap merging at the groove end away from said outlet opening with an annular groove in said inner cap surface which latter annular groove is wider in axial direction than said helical groove.

2. A two-way valve as described in claim 1, wherein said throughhole member comprises a relief valve responsive to a determined excess pressure of liquid in said main passage whereby liquid is permitted to pass through said outlet opening of said main passage even when said closure member is in closing position.

3. A liquid outlet valve comprising:
   a. a throughhole member having an entry opening, an outlet opening and a passageway between these openings for the flow of a fluid medium therethrough and being adapted for connection to a pipe for said fluid medium;
   b. a closure member having the shape of a cap and having an outlet opening in the bottom wall thereof, said closure member being associated with said throughhole member for engagement therewith to control said outlet opening of said passageway;
   c. a sealing means provided in said closing member downstream of said outlet opening of said throughhole member, and adapted for obturating the latter opening when said closure member is in close-off position relative to said throughhole member;

d. connecting means for movably connecting said closure member with said throughhole member, said connecting means serving to adjust the position of these two members relative to one another, thereby controlling the amount of liquid flowing through said passageway;

e. said throughhole member and said closure member having cylindrical surfaces opposite one another, and helical grooves of equal pitch but different depth in said cylindrical surfaces; and f. said connecting means comprising a coil spring having the same pitch as said grooves, the thickness of the wire of which coil spring is equal to approximately twice the depth of the flatter one of said two grooves, and further having a bias in radial direction relative to the helix described by said grooves which bias is directed into the flatter one of said grooves, the helical groove located in the inner cylindrical surface of said cap merging at the groove end away from said outlet opening with an annular groove in said inner cap surface which latter annular groove in said inner cap surface is wider in axial direction than said helical groove, and the helical groove in the outer wall of said throughhole member also merging at the end thereof away from said outlet opening, into an annular groove the width of which in axial direction is the same as that of said helical groove, the width of said helical groove in axial direction being only slightly larger than the wire thickness.

4. A liquid outlet valve as described in claim 3, wherein said cap surrounds said throughhole member at the outlet opening of the latter, said cap having in its frontal wall a discharge orifice and comprising holding means about said orifice for holding said sealing means.

5. A liquid outlet valve as described in claim 4, wherein said sealing means has the shape of an O-ring and is disposed below the lowermost turn of the helical grooves, said throughhole member having an annular groove near the lowermost end thereof in which groove said O-ring is inserted and said cap having inwardly of its discharge orifice about the latter a bevelled valve seat on which said O-ring is sealingly seated when said cap is in closing position.

6. A liquid outlet valve as described in claim 3, wherein said coil spring has an outwardly directed radial bias and wherein the depth of said helical groove in the inner cylindrical surface of said cap is less than the depth of said helical groove in the outer cylindrical surface of said throughhole member.

7. A liquid outlet valve as described in claim 6, wherein the depth of the flatter helical groove is at least approximately equal to half the wire thickness of said coil spring, while the depth of the other helical groove is at least about equal to the wire thickness of said coil spring.

* * * * *